whereby the gas generation step will proceed with close to the optimum theoretical utilization of the several reactants. Another and very important object of the present invention contemplates the operation of the process in such a manner that a portion of the hydrogen formed is consumed in the addition of external heat energy to the reaction system whereby the process can be operated either entirely or substantially entirely with endothermically reacting feed gases.

These objectives are achieved in accordance with the present invention by carrying out the interaction of the reactants in a synthesis gas reactor under conditions such that the hydrogen, as formed, is passed in contact with a diffusion barrier permeable to $H_2$ and the diffused hydrogen is burned at the barrier in support of the internal reaction. While the diffusion barrier may likewise permit diffusion of traces of carbon monoxide or other products of the reaction, nevertheless, as is well known in the art, it may be so selected that the diffusion of products other than hydrogen will be negligible. In short, there is a separation of hydrogen from the reaction products resulting in a proportionate increase of carbon monoxide in the synthesis gas.

As is known the diffusion of hydrogen may advantageously be improved and expedited by continuously removing evolved hydrogen from the vicinity of the exterior surface of the diffusion barrier. This is accomplished in accordance with the present invention by causing the diffused hydrogen to burn, substantially at the barrier. Thus the present invention supplies the heat energy necessary to maintain the endothermic reactions and to increase the temperature level, for improved operation in the case of a methane-oxygen reaction, for example. More specifically the invention contemplates the combustion of diffused hydrogen in such a manner as to heat the diffusion barrier, which being in direct heat exchange relationship to the reactants, efficiently transfers sensible heat to the reactants.

It is particularly important to note that the exothermic heat of reaction of hydrogen and oxygen is quite substantial as compared with the endothermic energy requirements for the reaction of a hydrocarbon gas and carbon dioxide, or water vapor. Thus, taking the reaction of methane and water vapor for example, with the production essentially of hydrogen and carbon monoxide in the molar ratio of 3:1, the combustion of ⅓ of the hydrogen produced will not only lower the $H_2$:CO ratio of the synthesis gas to 2:1 but will supply more than sufficient heat energy to meet the endothermic requirements of the system.

These factors are of further significance when it is appreciated that the diffused hydrogen can advantageously be burned in the interstices of the diffusion barrier by the process of surface combustion thereby raising the temperature of this member in direct heat exchange with the reactants, to a condition of incandescence. An advantage, therefore, of this aspect of the invention is that it provides a simple and effective method for carrying out reactions that are either completely or largely endothermic. While these remarks are of particular significance at the present time in respect to the reaction of methane and water vapor, it will be seen that they are also applicable to reactions involving hydrocarbons and carbon dioxide provided that a product gas of relatively high carbon monoxide content is preferred.

In order to describe the invention more in detail, reference is now made to the accompanying drawing wherein Fig. 1 discloses, more or less diagrammatically, a vertical section through a synthesis gas generator embodying the principles of the present invention; and Fig. 2 is a more or less diagrammatic representation of an alternative synthesis gas generator and associated flow system, represented on a more or less reduced scale.

In accordance with Fig. 1 of the drawing, 10 represents a synthesis gas generator having an outer cylindrical wall 11 and frustoconical end walls 12 and 13 respectively. The wall 12 is provided at its axial center with a mixing nozzle 14 comprising an interior nozzle 15 and an outer nozzle 16 coaxially disposed so that gaseous reactants fed therethrough are thoroughly and turbulently mixed in the vicinity of the outlet portions of the nozzle.

The outer nozzle 16 may be fed with one of the reactants through inlet pipe 17 whereas the inlet pipe 18 feeds the other gaseous reactant to the inner nozzle. The pipe 17 may supply methane or natural gas. However, any light gaseous hydrocarbons may be substituted therefor, and the process is equally adaptable to the use of heavier hydrocarbons of substantially any molecular weight provided they are suitably vaporized, atomized or otherwise supplied in condition suitable for reaction.

The inlet 18 may be fed with gaseous oxygen, carbon dioxide or water vapor or mixtures of these depending upon the availability of the respective reactants, the desired composition of the gas produced by the generator, and the temperature of reaction.

Thus, for example, while reaction of oxygen with methane is exothermic, reaction between the methane and carbon dioxide or water vapor is somewhat endothermic and use of substantial quantities of carbon dioxide or water vapor may necessitate careful conservation of heat energy. It is in connection with the water vapor-methane reaction that the invention will be more particularly described.

Preferably the inner faces of the frustoconical walls 12 and 13 are provided with a heat insulating, refractory lining 19 which terminates at permeable diffusion barrier 20. More specifically, the diffusion barrier 20, as shown, comprises a cylindrical wall or tube, radially spaced inwardly from the cylindrical wall 11 of the generator unit, and thus separating an internal or gas generation zone from an external jacket or zone for the recovery of hydrogen-rich gases.

From the foregoing it will be apparent that the cylindrical member 20 should be formed of any suitable material adapted to promote the preferential diffusion of hydrogen. In short, this member comprises a reticulated or porous wall section provided with continuous capillary or other passages extending from side to side and of such cross-sectional dimensions as to permit diffusion of hydrogen at a substantial rate while resisting, relatively, the diffusion of carbon monoxide and other gases in the reaction zone.

In operation of the present generator it is advisable to provide a diffusion barrier of a thickness of, for example, at least 0.010 inch and preferably of about 0.025 to 0.050 inch. Suitable tubes may be constructed of unglazed porcelain or porous Carborundum. Appreciating, of course, that the material must be of suitably refractory characteristics to withstand the elevated tempera
resis
alen
More
ceed
temp
stan
temp
frac
to t
vail In
pore
dim
amp
pore
path
in t
diffu
by e
rier Mo
heren
barri
has b
suitab
of hy
iron,
riers
is p
ers
Best
exam
nesia
layer
one t
is id
appl
mea
tion,
foil
face,
poro
may,
suffic
hyd
sup
usua
it is
to a
any
as ce Wi
is po
gree
of re Th
plied
oxyg
gas
of th
ucts W
enti
20 a
to p
Such
mati
stan
axial
tend
restr
the
Obvi
nece and carbon monoxide in a lower molar ratio than that of the gas which would be formed in the generator in the absence of the diffusion barrier. The products of combustion from the tube 23 may be used to preheat incoming gaseous reactants by any convenient heat exchange means, not shown.

The process may be operated with reactant gases consisting solely of methane and oxygen to produce a product in which the molar ratio of hydrogen to carbon monoxide is less than 2:1. It may also be operated upon reactants consisting of carbon dioxide and methane to produce a product wherein such ratio is less than 1:1 and in the case of reactants consisting of methane and water vapor the product ratio may be substantially less than the theoretical 3:1.

In order to better illustrate the process, reference is made to one specific operation wherein steam is reacted with methane in a devise such as disclosed in the figure and wherein the permeable tube defining the interior surface of the reaction zone is about 5' long and 10" in diameter and formed of highly porous Carborundum having an internal layer of palladium 0.001 inch thick. A mixture of methane and steam substantially in the molar ratio of 1:1 except for an excess of about 5% of water vapor is introduced through the nozzle and the reaction chamber initially raised to a temperature of 2500° F. by heating means not shown. The mixture of gas is introduced at the rate of about five standard cubic feet per minute. The outer jacket is supplied with substantially pure oxygen at a sufficient rate to burn all of the diffusion products along the outer surface of the diffusion tube. The hot gases from the jacket, as well as the synthesis gas product, are used to preheat incoming reactants to reaction zone.

Over a substantial period of operation the synthesis gas at the outlet tube of the generator comprises essentially hydrogen and carbon monoxide in the mollar ratio respectively of 2:1 as compared with the molar ratio of 3:1 which would normally prevail in the absence of the diffusional barrier.

While the foregoing exemplification of the proeess is based upon consideration of a two reactant system, the same principles apply in the case of multi-reactant systems employing mixtures of oxygen, carbon dioxide, and water vapor such as are met with in commercial practice. Where the proportion of oxygen is substantial it will be apparent that the provision of extraneous heating means within the reaction zone may be unnecessary, the relative proportion of carbon dioxide and/or water vapor which is used, depending upon the efficiency of the heat balance maintained in the system. Even where pure oxygen and methane are the sole reactants the heat of combustion of the diffused hydrogen is advantageous in maintaining gas generation zone temperatures which are higher than otherwise, and therefore more favorable to the reaction.

Where carbon dioxide is substituted in whole or in part for the water vapor it may advantageously be derived from the gasiform products of the synthesis reactor. In conventional practice these are normally passed to a condenser and separator, operating to separate the normally liquid constituents from the normally gaseous products consisting essentially of carbon dioxide and lighter gaseous hydrocarbons and frequently some small percentage of hydrogen. This gaseous stream may be recycled to the nozzle inlet pipe 18 and thus supplied as reactant to the gas generator. Venting of this stream may sometimes be necessary in order to prevent an undue accumulation of nitrogen or other inert gas therein.

By providing for recycle of product carbon dioxide, the present process permits close to theoretical utilization of the carbon content of the fresh feed materials resulting in a yield of hydrocarbons or oxygenated hydrocarbons close to optimum.

The details of operation of synthesis reactors are well known in the art, form no part of the operation of the present invention and are therefore omitted here. Suffice it to say that the catalyst comprises a metal of the iron group with or without suitable activators or promotors operated at pressures of about atmospheric upwardly and at temperatures of from 200–700° F.

In accordance with the embodiment shown in Fig. 2, the generator comprises a furnace 50 thoroughly insulated with refractory material 51 on its inner surface and provided with a bottom wall 52 and an upper stack portion 53. The reaction zone of the generator is, in the present instance, formed of a plurality of diffusion tubes 54 formed of suitable refractory, closed at the bottom, and lined with a thin layer of palladium. While only three tubes are shown in the diagrammatic representation any number may be employed. These are advantageously supported from a header 55 supplied with a flow of reactant gases from preheating coil 56. Internally, the header 55 is provided, as indicated, with a manifold 57 supporting dependent outlet tubes 58. As indicated more particularly in the drawing, the tubes 58, which are preferably formed of any suitable heat resisting metal, extend to a point just short of the bottom of the tubes 54 and are open ended whereby the gaseous reactants are caused to flow downwardly throughout the length of the diffusion walls centrally through the manifold 57 and thence through outlet pipe 59.

A burner 60 of any suitable construction is associated with the bottom of the furnace 50 for the purpose of supplying heat during start up periods or at other times as may be required. In the embodiment shown, the burner is adapted to be supplied with fuel gas through inlet pipe 61 and pipe 62 from any suitable source not shown. So also the arrangement of the burners is such as to permit flow of air into the furnace in order to support surface combustion in the walls of the tubes 54. In short the burners extend through oversize apertures through which may pass the air necessary to burn with the fuel gas and supply such additional air as is necessary.

Referring now to the operational arrangement of the generator, the reference numeral 63 represents an inlet for feed gas suitable for supplying, from a source not shown, a mixture of any of the foregoing reactants. For purposes of convenience and illustration it will be assumed that the charge gas comprises methane and water vapor in the molar ratio of substantially 1:1. The charge is fed through pipe 63 to a heat exchanger 64 adapted to preheat the reactants by indirect exchange with the generator gas. The preheated gases pass from the exchanger 64 by way of pipe 65 to the second preheating coil 56.

The generator gas, however, after passing the exchanger 64 is conveyed by conduit 66 to the synthesis reactor 67. The reaction product of the synthesis reactor is conducted by way of outlet pipe 68 through condenser 69 and pipe 70 to
pa
mo
no
pip
me
A
pas
con
and
ide
na
pe
bu
na
the
obj
gas
nitr
In
hea
bu
abl
Th
th
64
do
dir
of,
an
the
in
cid
fu
bu
in
Co
so
an
ma
va
A
en
ply
he
tu
be
po
era
clo
so
ten
bu
wi
th
cl
m
cc
ra
ab
er
rat
the
the
A
tha
ope
va
the
ox
re
ox
as
sh under way before the reactants contact the tubes.

Advantageously the reaction zone is operated under at least a slight positive pressure with respect to the purging zone but where the diffusion barrier is suitably supported, this positive pressure may be increased quite substantially as, for example, 5, 10 or even 200 pounds per square inch.

There are other reactions of an endothermic nature to which the invention is applicable. It may be used to dehydrogenate secondary alcohols to produce ketones, including acetone and the higher ketones, or to dehydrogenate hydrocarbons. A hydrocarbon such as butane may be dehydrogenated to produce butenes from which may be produced 2, butyl alcohol which in turn can be catalytically dehydrogenated to produce methyl ethyl ketone.

Obviously many other modifications and variations of the invention will be apparent to those skilled in the art in light of the foregoing disclosures without any enlargement of the spirit and scope thereof and therefore only such limitations should be imposed as are indicated in the following claims.

Reference is made to my copending case Serial No. 713,895 filed Dec. 4, 1946, which discloses similar subject matter.

I claim:

1. In the process of preparing synthesis gas comprising essentially hydrogen and carbon monoxide wherein hydrocarbon is reacted with water vapor within a reaction zone at an elevated reaction temperature above about 1400° F., the improvement which comprises continuously supplying said reactants to the reaction zone in relative proportions at which the reaction product comprises predominantly hydrogen and carbon monoxide, effecting said reaction adjacent a surface of a diffusion barrier selectively permeable to the diffusion of hydrogen and resistant to the diffusion of higher molecular weight gases, selectively separating hydrogen from the reactants in said reaction zone by causing product hydrogen to diffuse preferentially through said barrier, continuously supplying a stream of free oxygen to the exterior of said barrier, subjecting said diffused hydrogen at said exterior surface to combustion with said free oxygen, thereby heating said barrier to a temperature above said elevated reaction temperature and stripping effluent hydrogen therefrom, continuously transferring heat from said barrier to the reaction zone, effecting a substantial reaction of said reactants by heat thus transferred and continuously withdrawing from the reaction zone the residual gaseous reaction products comprising predominantly hydrogen and carbon monoxide.

2. The method according to claim 1, wherein the diffusion barrier comprises pores having a cross-sectional dimension in the order of one micron, effective to permit diffusion of hydrogen while resisting passage of higher molecular weight gases.

3. In the process of preparing synthesis gas comprising essentially hydrogen and carbon monoxide by the interaction of a hydrocarbon with water vapor at an elevated reaction temperature above about 1800° F., the improvement which comprises continuously supplying said reactants to a reaction zone at said elevated temperature, effecting substantial conversion of said reactants in the reaction zone into hydrogen and carbon monoxide in the vicinity of one surface of a diffusion barrier selectively permeable to the diffusion of hydrogen and relatively resistant to the diffusion of higher molecular weight gaseous products, continuously subjecting product hydrogen to selective separation from the reactants in said reaction zone by causing said hydrogen to diffuse preferentially through said barrier, continuously supplying a stream of free oxygen to the exterior of said barrier, subjecting said diffused hydrogen at said exterior surface to combustion with said free oxygen, heating the barrier by said combustion to an elevated temperature substantially above said reaction temperature, continuously transferring heat from said barrier to the reactants in said reaction zone, supplying a substantial portion at least of the endothermic heat requirements of said reaction by heat thus transferred, and continuously withdrawing from the reaction zone residual carbon monoxide together with residual hydrogen.

4. In an apparatus for the generation of synthesis gas comprising a synthesis gas generation chamber and a burning chamber, said chambers being separated by a wall comprising a diffusion barrier selectively permeable to hydrogen and substantially resistant to the diffusion of higher molecular weight gases therethrough, said barrier having one surface thereof in heat exchange relationship with the interior of the gas generation chamber and one surface exposed to the interior of the burning chamber, means for supplying a hydrocarbon and a reactant, oxygen-containing gas into said generation chamber, means spaced therefrom for withdrawing reaction product gases from said generation chamber, means for passing a stream of oxidizing gas into said burning chamber in contact with the second named surface of said barrier, thereby to burn effluent diffused hydrogen in the vicinity of said surface, and means for withdrawing combustion products from said burning chamber.

5. In the process of preparing synthesis gas comprising essentially hydrogen and carbon monoxide by the interaction of a hydrocarbon gas with water vapor at an elevated reaction temperature above about 1800° F., the steps which comprise continuously supplying said reactants to a reaction zone in approximately the stoichiometrical relationship for the production of hydrogen and carbon monoxide, effecting said reaction in contact with a diffusion barrier selectively permeable to the diffusion of hydrogen and relatively impermeable to the higher molecular weight gaseous products, thereby continuously subjecting product hydrogen to selective separation from the reactants by passage preferentially through said barrier, continuously burning diffused hydrogen at the exterior surface of said barrier in the presence of free oxygen supplied to said exterior surface to materially increase the rate of diffusion and heat said diffusion barrier to a temperature substantially above said reaction temperature, transferring heat from the barrier to the interior of said reaction zone at a rate sufficient to continuously maintain said reaction zone at said reaction temperature and continuously withdrawing from the reaction zone the product carbon monoxide together with a predetermined portion of undiffused hydrogen.

6. In the process of preparing synthesis gas comprising essentially hydrogen and carbon monoxide in the molecular ratio approximately 2:1 by the interaction of a hydrocarbon gas with water vapor at an elevated reaction temperature above about 1800° F., the improvement which comprises supplying said reactants to a reaction zone maintained at said elevated temperature, effecting su
the re
monox
selecti
and s
highe
jectin
by di
burn
free
there
perat
diffus
barrie
said r
the c